United States Patent Office 3,463,860
Patented Aug. 26, 1969

3,463,860
FEED COMPOSITION FOR INCREASING FERTILITY IN ANIMALS
Frede B. Strandskov, North Caldwell, and Hyman L. Schulman, Oradell, N.J., assignors of one-half to Washine Chemical Corporation, Lodi, N.J., and one-half to The F. & M. Schaefer Brewing Co., both corporations of New York
No Drawing. Continuation-in-part of application Ser. No. 559,720, June 17, 1966. This application May 17, 1967, Ser. No. 639,052
Int. Cl. A61k 27/00; A23k 1/16
U.S. Cl. 424—308         5 Claims

ABSTRACT OF THE DISCLOSURE

Feed compositions for warm-blooded animals are provided which increase the fertility of the animals to which they are administered. The method is provided by which such compositions are administered to the animals. The compositions consist essentially of feed and an effective amount of a compound of the formula

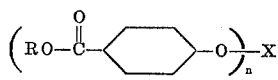

wherein
R is n-heptyl,
X is a member of the group consisting of H, alkali metal, and alkaline earth metal, and
$n$ is an integer equal to the valence of X.

---

This application is a continuation-in-part of application Ser. No. 559,720, filed June 17, 1966 and now abandoned.

This invention relates to a feeding composition for warm-blooded animals which increases the fertility of the animals to which it is administered. More particularly, the present invention relates to a feeding composition containing the n-heptyl ester of para-hydroxybenzoic acid and/or salt thereof.

The profitability of animal breeding, whether it be with respect to food animals (e.g., cows, pigs, sheep, etc.) or other domesticated animals (e.g., horses, minks, mice, rabbits, rats, guinea pigs, etc.), depends, to a great extent, upon the number of pregnancies per mating. For example, it has been estimated that dairymen lose 10% of their total dairy income because of cows that fail to settle, i.e., fail to become pregnant after the first mating.

The costs of animal breeding could be substantially reduced if there were developed a method and/or composition which would increase the number of pregnancies per mating or increase the number of animals in each litter, or possibly both. However, increasing the number of pregnancies per mating is preferable since this can be applied to animals having limited litters, e.g., cows, as well as to animals having large litters. In addition to the foregoing criteria, a good fertility composition should not cause gross abnormalities in the animals (either to the parent or the off-spring), or increase the number of animals born dead when used in concentrations sufficient to increase fertility.

It is an object of the present invention to embody a fertility composition which fulfills the enumerated desiderata, viz a fertility composition which increases the number of pregnancies per mating (hereinafter designated as the fertility index which is the number of pregnancies divided by the number of matings multiplied by 100). Briefly stated, the present invention fulfills the enumerated desiderata by administering to warm-blooded animals (either female and/or male), before mating, a feed containing the n-heptyl ester of para-hydroxybenzoic acid or certain salts thereof. The aforesaid ester has the following formula:

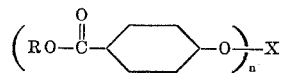

in which R is n-heptyl, X is H, an alkali metal (e.g., sodium, potassium, etc.) or alkaline earth metal (e.g. calcium, etc.), and $n$ is an integer equal to the valence of X.

Applicants do not wish to be bound to any theory of how the invention operates. However, in view of the fact that it is known that the lower alkyl esters of para-hydroxybenzoic acid, e.g., the methyl, ethyl, propyl and butyl esters, are metabolized in the body to the corresponding alcohol and ester (Jones et al., Journal of the American Pharmaceutical Association, vol. 45, pp. 268 through 273, 1956), it is very possible that the compounds of this invention are also metabolized in the body to the corresponding acid (i.e., para-hydroxybenzoic acid) and alcohol (i.e., n-heptyl alcohol).

The method of this invention comprises orally administering the aforementioned compounds to a warm-blooded animal prior to mating.

The amount of compound administered may vary, depending upon the particular type of animal, the maturity of the animal and the sex of the animal. However, generally the amount of compound administered to the mature animal is between .04 gram to 6 grams per kilogram (weight of the animal) per day. The compound is administered by adding it to the feed of the animal. The amount of the compound in the feed is from 0.1 to 4% (by weight). Preferably, the amount is from 1 to 3% by weight of the normal diet. This latter determination is very accurate because it takes into account the variances of the individual animal. That is, the diet of each animal, of course, depends upon various factors such as age, type of animal, and sex, and if the amount of fertility compound to be administered is calculated as a percent of the diet, these various factors are automatically taken into consideration.

The composition of this invention is administered prior to mating, e.g. each day for four weeks prior to mating. Preferably, the composition is administered for longer periods of time, e.g. up to fourteen weeks or longer.

The warm-blooded animals to which the compounds of this invention may be administered with desirable effects are commercial animals (e.g. rats, mice, rabbits, hamsters, guinea pigs, mink and the like) and food animals (e.g. pigs, cows, sheep and the like).

The feeds to which the para-hydroxybenzoic acid is added can be any of the feed or nutrient rations commonly fed to the animals enumerated supra.

These feeds include grain, e.g., corn, wheat, oats, and barley; grain products, e.g., corn gluten feed, wheat middlins, and wheat bran; oil by-products, e.g., soybean meal, cottonseed meal, and linseed meal; forage, both green and dry, e.g., legumes and grasses such as alfalfa and clover; and by-products of sugar manufacture, molasses, beet pulp and the like. These feeds may contain other sources of protein, fat, minerals and vitamins.

As illustrative of one feed which can be used for feeding, e.g., cattle or pigs, is the following composition:

| | Percent |
|---|---|
| Forage | 27 |
| Rice bran | 10 |
| Corn | 28 |
| Barley | 15 |
| Alfalfa meal | 5 |
| Soy bean meal | 7 |
| Fish meal | 2 |
| Calcium carbonate | 1.5 |
| Sodium chloride | 0.5 |
| Mineral mixture [1] | 0.1 |
| Vitamin mixture [2] | 0.15 |
| Calcium secondary phosphate | 0.75 |
| n-Heptyl ester of parahydroxybenzoic acid | 3 |

[1] Mineral mixture contains:

| | Percent |
|---|---|
| Manganese | 24 |
| Zinc | 18 |
| Iron | 8 |
| Copper | 1 |
| Iodine | 0.5 |
| Cobalt | 0.2 |

[2] Vitamin mixture contains:

| | | |
|---|---|---|
| Vitamin A | IU | 800,000 |
| Vitamin D | IU | 200,000 |
| Vitamin E | IU | 400 |
| Vitamin $B_{12}$ | mg | 1.6 |
| Riboflavin | mg | 800 |
| Niacin | mg | 5,000 |
| d-Pantothenic acid | mg | 1,000 |
| Choline chloride | mg | 70,000 |
| Menadione | mg | 264 |
| dl-Methionine | mg | 68 |
| Folic acid | mg | 60 |
| 1,2-dihydro-6-ethoxy-2,2,4-trimethyl-quinoline | mg | 1.4 |

The following are presently preferred embodiments of the invention and are for the purpose of illustration and are not to be considered exhaustive or limitative. All percentages are by weight unless otherwise stated.

Example I

Seventy-two new-born albino rats (48 females and 24 males), of the Charles River caesarian-derived strain, were used. The rats were divided into three groups, each group comprising eight males and sixteen females. The first group (hereinafter designated control) were fed a basal diet of Purina Standard Laboratory Chow which has the following analysis:

| | Not less than (percent) |
|---|---|
| Crude protein | 23 |
| Crude fat | 4.5 |
| Crude fiber | 6 |
| Ash | 9 |

The second group was fed a mixture containing 99% by weight of Purina Laboratory Chow and 1% by weight of the n-heptyl ester of para-hydroxybenzoic acid. The third group was fed a mixture containing 97% Purina Laboratory Chow and 3% by weight of the aforesaid ester (hereinafter designated as WS-7). The animals were fed their respective diets for 14 weeks. The weight of the male rats and the amount fed are shown in Table I and the weight of the female rats and the amount fed are shown in Table II.

The first column under "Wt." in each of the tables is the mean weekly body weight in grams of the rats. The second column under "Wt. Range" is the weight ranges and the third column under "Food" is the mean weekly food consumption in grams per kilograms of body weight per day.

After 14 weeks the rats were mated by placing one male and two females in a breeding cage for 21 days. The results were as follows:

| | Control | 1.0% | 3.0% |
|---|---|---|---|
| No. of matings | 16 | 16 | 16 |
| No. of pregnancies | 12 | 16 | 15 |
| Fertility index, percent | 75 | 100 | 93 |
| No. litters born | 12 | 15 | 15 |
| Gestation index, percent | 100 | 93 | 100 |
| No. pups born | 134 | 182 | 153 |
| No. pups born alive | 133 | 182 | 151 |
| Live birth index, percent | 99.3 | 100 | 98.7 |
| No. pups left to nurse | 90 | 112 | 112 |
| No. weaned | 62 | 84 | 97 |
| Lactation index, percent | 68.9 | 75.0 | 86.6 |
| Mean litter size born: | | | |
| Males | 6 | 7 | 5 |
| Females | 5 | 6 | 5 |

Example II

The parent rats of Example I were remated to produce their second litters. The results were as follows:

| | Control | 1.0% | 3.0% |
|---|---|---|---|
| No. of matings | 16 | 16 | 16 |
| No. of pregnancies | 10 | 16 | 15 |
| Fertility index, percent | 62.5 | 100 | 93.8 |
| No. litters born | 10 | 15 | 15 |
| Gestation index, percent | 100 | 93.8 | 100 |
| No. pups born | 106 | 187 | 148 |
| No. pups born alive | 106 | 187 | 148 |
| Live birth index, percent | 100 | 100 | 100 |
| No. pups left to nurse | 71 | 120 | 104 |
| No. weaned | 58 | 100 | 93 |
| Lactation index, percent | 81.7 | 83.3 | 94.2 |
| Mean litter size born: | | | |
| Males | 5 | 6 | 5 |
| Females | 6 | 7 | 5 |

Example III

The weanlings produced in Example II, after a twenty-one day nursing period, were used in this example. Sixteen female and eight male weanlings were selected at random from the control and two test groups.

These rats were individually housed and maintained on the same diets as set forth in Example I, i.e., the rats were divided into three groups each containing eight males and sixteen females; the diet of each group being as in Example I. They were fed for fourteen weeks and then mated in the same manner as the preceding example. The results were as follows:

| | Control | 1.0% | 3.0% |
|---|---|---|---|
| No. of matings | 16 | 16 | 16 |
| No. of pregnancies | 14 | 15 | 14 |
| Fertility, percent | 87.5 | 93.8 | 87.5 |
| No. litters born | 13 | 15 | 14 |
| Gestation index, percent | 92.9 | 100 | 100 |
| No. pups born | 145 | 154 | 149 |
| No. pups born alive | 145 | 154 | 149 |
| Live birth index, percent | 100 | 100 | 100 |
| No. pups left to nurse | 94 | 112 | 104 |
| No. weaned | 78 | 104 | 87 |
| Lactation index, percent | 83.0 | 92.9 | 83.7 |
| Mean litter size born: | | | |
| Males | 6 | 6 | 5 |
| Females | 5 | 4 | 5 |

Example IV

The parent rats of Example III were remated to produce their second litters. The results were as follows:

| | Control | 1.0% | 3.0% |
|---|---|---|---|
| No. of matings | 16 | 16 | 16 |
| No. of pregnancies | 14 | 15 | 14 |
| Fertility index, percent | 87.5 | 93.8 | 87.5 |
| No. litters born | 14 | 15 | 14 |
| Gestation index, percent | 100 | 100 | 100 |
| No. pups born | 160 | 169 | 133 |
| No. pups born alive | 159 | 169 | 133 |
| Live birth index, percent | 99.4 | 100 | 100 |
| No. pups left to nurse | 103 | 117 | 102 |
| No. weaned | 71 | 100 | 98 |
| Lactation index, percent | 68.9 | 85.5 | 96.1 |
| Mean litter size born: | | | |
| Males | 5 | 5 | 5 |
| Females | 6 | 6 | 5 |

Example V

Sixteen females and eight males were selected, at random, from each group of weanlings produced in Example IV (seventy-two rats in all). Each rat was housed individually for fourteen weeks and each rat, from each group, was fed the same diet as set forth in Example I. They were then mated and the results are as set forth below:

|  | Control | 1.0% | 3.0% |
|---|---|---|---|
| No. of matings | 16 | 16 | 16 |
| No. of pregnancies | 13 | 16 | 16 |
| Fertility index, percent | 81.3 | 100 | 100 |
| No. litters born | 13 | 16 | 16 |
| Gestation index, percent | 100 | 100 | 100 |
| No. pups born | 129 | 184 | 182 |
| No. pups born alive | 129 | 182 | 182 |
| Live birth index, percent | 100 | 98.9 | 100 |
| No. pups left to nurse | 91 | 123 | 128 |
| No. weaned | 88 | 123 | 124 |
| Lactation index, percent | 96.7 | 100 | 96.9 |
| Mean litter size born: |  |  |  |
| Males | 5 | 6 | 6 |
| Females | 5 | 5 | 5 |

Example VI

The parent rats of Example V were remated to produce their second litters. The results were as follows:

|  | Control | 1.0% | 3.0% |
|---|---|---|---|
| No. of matings | 16 | 16 | 16 |
| No. of pregnancies | 14 | 16 | 16 |
| Fertility index, percent | 87.5 | 100 | 100 |
| No. litters born | 14 | 16 | 16 |
| Gestation index, percent | 100 | 100 | 100 |
| No. pups born | 173 | 200 | 193 |
| No. pups born alive | 173 | 195 | 193 |
| Live birth index, percent | 100 | 97.5 | 100 |
| No. pups left to nurse | 108 | 120 | 126 |
| No. weaned | 104 | 114 | 112 |
| Lactation index, percent | 96.3 | 95.0 | 88.9 |
| Mean litter size born: |  |  |  |
| Males | 7 | 6 | 7 |
| Females | 6 | 6 | 5 |

A summary of the affect of the n-heptyl ester of parahydroxybenzoic acid on fertility index and lactation index, as derived from the results set forth in the preceding examples, is given in the following table:

| Index | Control | 1.0% | 3.0% |
|---|---|---|---|
| Fertility, percent | 80.2 | S97.9 | S93.8 |
| Lactation, percent | 82.8 | S88.8 | S91.1 |

S=Significantly higher than control, $p<.05$.

The test for significance was the Chi-square test.

TABLE I

| Time interval, weeks | Control | | | 1.0% | | | 3.0% | | |
|---|---|---|---|---|---|---|---|---|---|
|  | Wt., g. | Wt. range, g. | Food, g./kg./day | Wt., g. | Wt. range, g. | Food, g./kg./day | Wt., g. | Wt. range, g. | Food, g./kg./day |
| Initial | 152 | 134–169 |  | 153 | 135–168 |  | 152 | 133–167 |  |
| 1 | 203 | 175–230 | 119 | 199 | 182–216 | 107 | 186 | 157–212 | 102 |
| 2 | 243 | 214–269 | 96.9 | 238 | 206–266 | 100 | 227 | 205–253 | 101 |
| 3 | 294 | 270–315 | 91.9 | 289 | 255–324 | 87.7 | 279 | 258–304 | 89.8 |
| 4 | 329 | 300–359 | 80.1 | 329 | 299–364 | 85.5 | 321 | 294–348 | 85.2 |
| 5 | 371 | 349–388 | 79.2 | 364 | 326–398 | 76.6 | 359 | 318–398 | 76.9 |
| 6 | 396 | 370–441 | 71.1 | 391 | 348–420 | 73.3 | 384 | 342–429 | 69.9 |
| 7 | 426 | 394–485 | 66.7 | 415 | 371–446 | 67.7 | 412 | 366–460 | 63.9 |
| 8 | 459 | 418–521 | 61.3 | 438 | 388–477 | 59.9 | 437 | 383–489 | 58.8 |
| 9 | 479 | 435–546 | 56.0 | 459 | 404–504 | 56.3 | 459 | 391–524 | 54.5 |
| 10 | 488 | 440–564 | 52.2 | 475 | 418–515 | 54.1 | 478 | 401–538 | 54.2 |
| 11 | 496 | 450–580 | 52.0 | 485 | 425–530 | 53.3 | 480 | 400–530 | 51.9 |
| 12 | 505 | 460–596 | 49.0 | 492 | 436–544 | 47.9 | 489 | 400–540 | 48.6 |
| 13 | 523 | 472–616 | 47.2 | 514 | 451–566 | 48.2 | 503 | 415–559 | 48.4 |
| 14 | 528 | 478–628 | 47.5 | 520 | 450–580 | 48.9 | 505 | 411–568 | 48.8 |

TABLE II

| Time interval, weeks | Control | | | 1.0% | | | 3.0% | | |
|---|---|---|---|---|---|---|---|---|---|
|  | Wt., g. | Wt. range, g. | Food, g./kg./day | Wt., g. | Wt. range, g. | Food, g./kg./day | Wt., g. | Wt. range, g. | Food, g./kg./day |
| Initial | 133 | 119–149 |  | 133 | 117–152 |  | 132 | 117–149 |  |
| 1 | 157 | 121–179 | 111 | 154 | 133–166 | 111 | 150 | 130–166 | 108 |
| 2 | 174 | 152–200 | 105 | 171 | 154–196 | 98.4 | 166 | 140–182 | 105 |
| 3 | 200 | 179–220 | 94.7 | 193 | 169–222 | 91.1 | 187 | 164–213 | 87.2 |
| 4 | 213 | 184–239 | 90.4 | 208 | 181–240 | 86.7 | 200 | 170–229 | 83.9 |
| 5 | 227 | 196–250 | 82.5 | 222 | 194–255 | 79.7 | 210 | 179–237 | 78.7 |
| 6 | 237 | 203–265 | 77.6 | 228 | 195–263 | 73.7 | 218 | 178–253 | 76.1 |
| 7 | 246 | 207–279 | 73.2 | 235 | 198–255 | 72.7 | 222 | 171–258 | 74.0 |
| 8 | 254 | 219–289 | 72.6 | 243 | 206–276 | 70.5 | 232 | 181–271 | 74.3 |
| 9 | 261 | 221–296 | 67.6 | 253 | 213–286 | 67.4 | 240 | 190–284 | 69.0 |
| 10 | 265 | 229–306 | 66.3 | 258 | 215–298 | 64.7 | 243 | 190–291 | 63.8 |
| 11 | 270 | 228–310 | 64.5 | 262 | 213–301 | 64.8 | 244 | 196–296 | 62.6 |
| 12 | 274 | 240–316 | 64.1 | 268 | 219–308 | 60.4 | 250 | 206–299 | 64.8 |
| 13 | 280 | 245–329 | 60.0 | 275 | 222–318 | 57.9 | 259 | 214–308 | 61.3 |
| 14 | 281 | 240–327 | 63.5 | 276 | 217–321 | 63.1 | 256 | 207–311 | 66.4 |

Example VII

Example I was repeated with the exception that in lieu of leaving the rats together for twenty-one days as in Example I, the rats were permitted to remain together for only one mating and the rats were mated when they were 33 weeks old. Mating was determined by vaginal smear technique. The vaginal smear test was performed on each female rat each day until the presence of sperm was detected. Upon such detection the male and female were separated. The fertility index data that were obtained utilizing this technique are set forth below.

|  | Control group | 1.0% | 3.0% |
|---|---|---|---|
| Fertility index, percent | 80 | 90 | 95 |

The weight of the rats and the amounts fed are shown in Table III below.

Having thus disclosed the invention what is claimed is:

1. A method for increasing fertility in warm-blooded animals which comprises orally administering to the animals a fertility increasing amount of a compound of the formula:

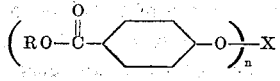

wherein R is n-heptyl, X is a member selected from the group consisting of H, alkali metal, and alkaline earth metal, and $n$ is an integer equal to the valence of X.

2. A method according to claim 1 wherein X is H.

3. A method for increasing the fertility of warm-blooded animals which comprises feeding the animal a feed containing at least 0.1% by weight of the n-heptyl ester of para-hydroxybenzoic acid.

4. A method according to claim 3 wherein the amount of n-heptyl ester of para-hydroxybenzoic acid in the feed is between 0.1% and 4% by weight.

5. A method according to claim 3 wherein the amount of n-heptyl ester of para-hydroxybenzoic acid in the feed is between 1% and 3% by weight.

TABLE III

| Time interval, weeks | Control | | | 1.0% | | | | 3.0% | | | |
|---|---|---|---|---|---|---|---|---|---|---|---|
| | Body weight,[1] g. | Food cons.,[2] g. | Food, grams/ kilo/ day [3] | Body weight,[1] g. | Food cons.,[2] g. | Food, grams/ kilo/ day [3] | Compound,[4] mg./kg./ day | Body weight,[1] g. | Food cons.,[2] g. | Food, grams/ kilo/ day [3] | Compound,[4] mg./kg./ day |

Males

| Time | Body wt. | Food cons. | g/k/d | Body wt. | Food cons. | g/k/d | Compound | Body wt. | Food cons. | g/k/d | Compound |
|---|---|---|---|---|---|---|---|---|---|---|---|
| Initial | 78 | | | 78 | | | | 78 | | | |
| 4 | 282 | 166 | 84 | 291 | 178 | 87.4 | 874 | 261 | 165 | 90.3 | 2,710 |
| 13 | 492 | 181 | 52.8 | 492 | 181 | 53.6 | 526 | 458 | 165 | 51.3 | 1,540 |
| 33 | 595 | 170 | 42.2 | 619 | 170 | 39.2 | 392 | 571 | 162 | 40.7 | 1,220 |
| 43 | 634 | 170 | 38.3 | 601 | 174 | 41.4 | 414 | 595 | 153 | 36.6 | 1,100 |

Females

| Time | Body wt. | Food cons. | g/k/d | Body wt. | Food cons. | g/k/d | Compound | Body wt. | Food cons. | g/k/d | Compound |
|---|---|---|---|---|---|---|---|---|---|---|---|
| Initial | 75 | | | 74 | | | | 74 | | | |
| 4 | 200 | 120 | 85.5 | 191 | 115 | 86.0 | 860 | 187 | 115 | 88.0 | 2,640 |
| 13 | 281 | 128 | 65.1 | 266 | 121 | 65.0 | 650 | 255 | 126 | 70.6 | 2,120 |
| 33 | 339 | 158 | 66.6 | 306 | 135 | 63.0 | 630 | 312 | 135 | 61.6 | 1,850 |
| 43 | 359 | 152 | 60.4 | 335 | 140 | 59.7 | 597 | 323 | 148 | 65.3 | 1,960 |

[1] Indicates mean body weight of the rats.
[2] Represents food consumption per week for the period indicated.
[3] Represents grams of food consumed per kilogram of body weight per day.
[4] Represents milligrams of compound per kilogram per day.

References Cited

Chemical Abstracts 52:4874–4875 (1957).

ALBERT T. MEYERS, Primary Examiner

VERA C. CLARKE, Assistant Examiner